(12) United States Patent
Kiełczykowski et al.

(10) Patent No.: US 12,516,665 B2
(45) Date of Patent: Jan. 6, 2026

(54) CHECK VALVE FOR RAT RE-STOW PUMP

(71) Applicant: Hamilton Sundstrand Corporation, Charlotte, NC (US)

(72) Inventors: Przemysław Kiełczykowski, Kiełczów (PL); Piotr Michał Bereszyński, Głogów (PL); Damian Słodczyk, Lubliniec (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/906,902

(22) Filed: Oct. 4, 2024

(65) Prior Publication Data
US 2025/0116268 A1    Apr. 10, 2025

(30) Foreign Application Priority Data
Oct. 10, 2023   (EP) .................................... 23461665

(51) Int. Cl.
| | | |
|---|---|---|
| *F04B 53/10* | (2006.01) | |
| *B64D 41/00* | (2006.01) | |
| *F04B 23/02* | (2006.01) | |
| *F16K 15/04* | (2006.01) | |

(52) U.S. Cl.
CPC ........ *F04B 53/1002* (2013.01); *B64D 41/007* (2013.01); *F04B 23/02* (2013.01); *F16K 15/044* (2013.01)

(58) Field of Classification Search
CPC .... F04B 53/1002; F04B 23/02; F04B 53/109; B64D 41/007; F16K 15/044; F16K 15/042; F16K 27/0209; F16K 11/105
See application file for complete search history.

(56) References Cited

U.S. PATENT DOCUMENTS

| | | | |
|---|---|---|---|
| 3,089,430 A | | 5/1963 | Shafer et al. |
| 3,824,043 A | | 7/1974 | Nordell |
| 3,911,678 A | | 10/1975 | Shafer et al. |
| 4,102,128 A | * | 7/1978 | Shafer ..................... F16K 31/12 |
| | | | 60/400 |
| 4,567,911 A | * | 2/1986 | Kedem ................. F16K 15/063 |
| | | | 137/454.5 |
| 5,611,200 A | * | 3/1997 | Moenkhaus ............ F15B 11/02 |
| | | | 60/494 |

(Continued)

FOREIGN PATENT DOCUMENTS

| | | |
|---|---|---|
| EP | 2363579 A1 | 9/2011 |
| EP | 3095708 A1 | 11/2016 |

OTHER PUBLICATIONS

European Search Report for Application No. 23461665.4, mailed Apr. 18, 2024, 10 pages.

*Primary Examiner* — Hoang M Nguyen
(74) *Attorney, Agent, or Firm* — CANTOR COLBURN LLP

(57) ABSTRACT

A check valve assembly includes a valve body having a first end and a second end, the valve body extending along an axis (X) from the first end to the second end; a check valve outlet is located between the first and the second end; an actuator port provided in the check valve body at a location axially between the outlet and the second end, for fluid connection, in use, to a pump actuator. The valve body further includes a fluid inlet via which the check valve is, in use, connected to a fluid tank, the fluid inlet being provided in the valve body towards the second end, axially between the actuator port and the second end.

17 Claims, 3 Drawing Sheets

(56) References Cited

U.S. PATENT DOCUMENTS 6,113,365 A 9/2000 Siegel
2013/0276916 A1* 10/2013 Simpson ................. F16K 17/06
                                                        137/511
2018/0038498 A1* 2/2018 Veto ...................... F16K 15/148

* cited by examiner

CHECK VALVE FOR RAT RE-STOW PUMP

CROSS-REFERENCE TO RELATED APPLICATIONS

This application claims the benefit of European Patent Application No. 23461665.4 filed Oct. 10, 2023, the disclosure of which is incorporated herein by reference in its entirety.

TECHNICAL FIELD

The disclosure is concerned with a check valve for a pump assembly for retracting or re-stowing a ram air turbine, RAT, of an aircraft.

BACKGROUND

Ram air turbines, RATs, are small emergency turbines that may be provided in the fuselage or wing of an aircraft to be deployed in the case of failure of a main engine to provide emergency power. The RAT may be manually or automatically deployed, by means of a RAT actuator, into an airstream of the aircraft and rotates in the airstream to generate power for the aircraft. Once deployed, the RAT or RAT actuator is locked in the deployed position by a locking pin or mechanism to avoid the RAT being inadvertently pushed back into the retracted or stowed position by e.g. air forces. Typically, it is not possible to retract/re-stow the RAT during flight and the re-stowing is performed as a ground operation using a hydraulic re-stow pump assembly to provide hydraulic fluid to the RAT actuator to cause it to move in the re-stow direction.

A RAT actuator typically comprises a piston movably located within a hydraulic cylinder. To deploy the RAT, hydraulic fluid is provided to one side of the piston in the cylinder to extend the piston from the cylinder, the free end of the piston being connected to the RAT to deploy the RAT from the body of the aircraft where it has been stowed.

The re-stow pump is attached to the actuator assembly to provide hydraulic fluid to the cylinder on the other side of the piston to retract the piston back into the cylinder and thus to stow the RAT.

Typically, check valves are required in the re-stow pump assembly to avoid excessive pressure which can damage the actuator or the RAT. The check valves respond to excess pressure in the pump system by opening and recirculating fluid back to the pump fluid tank.

Current designs typically include two check valves each performing a different stage of operation, which are relatively expensive parts. There is a need for an improved check valve which is simpler and less expensive to manufacture and install.

SUMMARY

According to the disclosure there is provided a check valve assembly for a RAT re-stow pump, the check valve assembly comprising a valve body having a first end and a second end, the valve body extending along an axis from the first end to the second end; a check valve outlet is located between the first and the second end; an actuator port provided in the check valve body at a location axially between the outlet and the second end, for fluid connection, in use, to a pump actuator, the valve body further comprising a fluid inlet via which the check valve is, in use, connected to a fluid tank, the fluid inlet being provided in the valve body towards the second end, axially between the actuator port and the second end; the assembly further comprising check valve components located in the check valve body configured to control the flow of fluid entering the check valve from the tank via the inlet port, and leaving the check valve via the outlet, according to the first and second stages of operation, the check valve components comprising a first ball located in the valve body adjacent the first end, and a second ball located in the valve body adjacent the second end, and a check valve spring provided in spring force engagement with the second ball, the check valve spring being sized and positioned to bias the second ball towards the second end; wherein a first stage pressure differential between the actuator port and the fluid inlet creates a fluid flow path from the inlet to the actuator port by causing the second ball to press against the bias of the check valve spring to create a flow passage between the second ball and the second end, and causing the first ball to block the flow of fluid to the outlet, and wherein removal of the first stage pressure differential causes the check valve spring to return the second ball to its biased position to close the passage from the fluid inlet to the actuator port and to cause the first ball to move to open a fluid passage between the actuator port and the outlet.

BRIEF DESCRIPTION OF FIGURES

Examples of the check valve assembly according to the disclosure will now be described in detail with reference to the drawings. It should be noted that these are examples only and that variations are possible within the scope of the claims.

DETAILED DESCRIPTION

Figure 1:
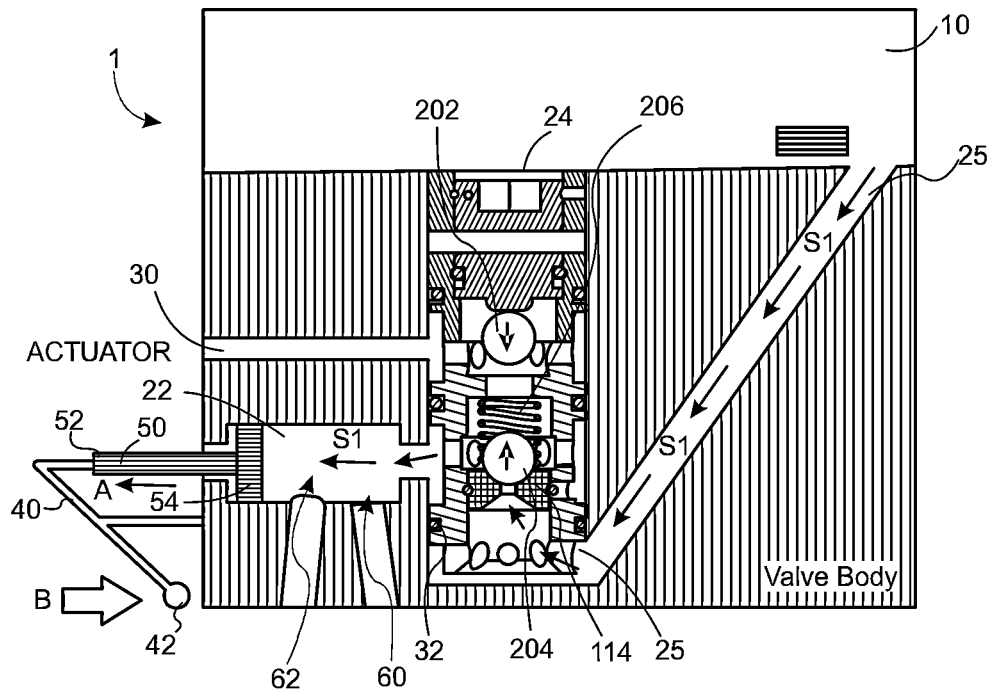
FIG. 1 is a schematic view showing a first stage of operation of a check valve assembly according to the disclosure in a re-stow pump.

Referring first to FIG. 1, a re-stow pump is shown of a type within which may be provided a check valve according to this disclosure. In the example, the pump has a pump housing 1 containing a tank 10 storing hydraulic fluid and a valve housing 20 which houses the pump valve assembly including the pump actuator 22 and the check valve 24, the check valve 24 being connected between the tank 10, via a fluid inlet 25, and an outlet 30 to the RAT actuator. The RAT actuator and other features of the RAT will not be described here as these are known in the art and do not form part of this disclosure.

In the example, a pump operating lever 40 extends out from the pump housing 1 for operation by the ground crew to re-stow the RAT. The lever 40 has a free end 42 and an opposite end connected in a cantilevered manner to a free end 52 of a piston 50 of the pump. The other end of the piston defines a piston head 54 movably located in a pump cylinder 60. The cantilevered form of the lever is just one example, and a simple push-pull lever (which would then operate in the opposite direction to that described below) can also be used.

Without the check valve, operating the lever 40 would push the piston 50 to move the piston head 54 along the cylinder 60 to press fluid, from the tank 10, to the outlet 30 and to the RAT actuator to move the RAT actuator piston in the stow direction. The check valve 24 is located in the fluid path in the re-stow pump to prevent over-pressurization, as described further below.

The pump actuator has two stages of operation, a first stage in which fluid is drawn from the tank into the pump actuator cylinder 60, and a second stage in which the fluid is ejected from the pump actuator through the outlet 30 to drive the re-stow actuator.

In the first stage (shown in FIG. 1 and described further below), the pump lever 40 is operated to draw the pump piston head along the cylinder 60 in a direction A towards the pump housing. In the example shown, this is done by pressing or pushing the free end 42 of the lever 40 towards the pump housing in direction B. With a simple, non-cantilevered lever, the direction of operation would be in direction A. The operation should draw the piston head along the cylinder 60 in direction A, and various ways can be envisaged for performing this action. The cantilevered lever, shown, is one example only.

As the piston head is drawn along the cylinder in direction A, fluid is drawn from the tank 10 through the check valve 24 (further described below) into the piston chamber 62, as shown by arrows S1. The fluid collects in the chamber 62 until the piston reaches the end of its stroke. The pressure differential across the check valve causes the check valve to close off the flow from the tank (again as will be described further below).

Figure 2:
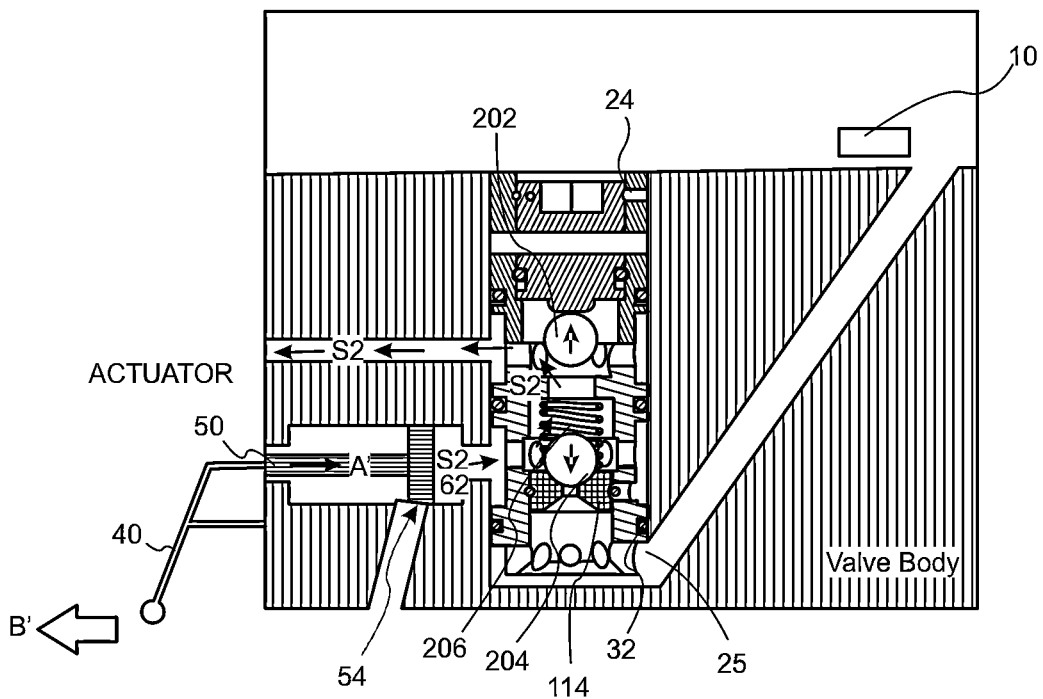
FIG. 2 is a schematic view showing a second stage of operation of a check valve assembly as shown in FIG. 1.

In the second stage of the pump operation, as shown in FIG. 2, the lever is operated in the opposite direction (here B') which acts on the piston 50 to push the piston back into the piston chamber 62 (direction A') such that the piston head 54 forces the fluid that has collected in the chamber in the first stage (FIG. 1) through the check valve now in its second stage position (described further below) in the direction of arrows S2 to and through the outlet 30 to the RAT actuator to cause the RAT actuator to stow the RAT.

Figure 3A:
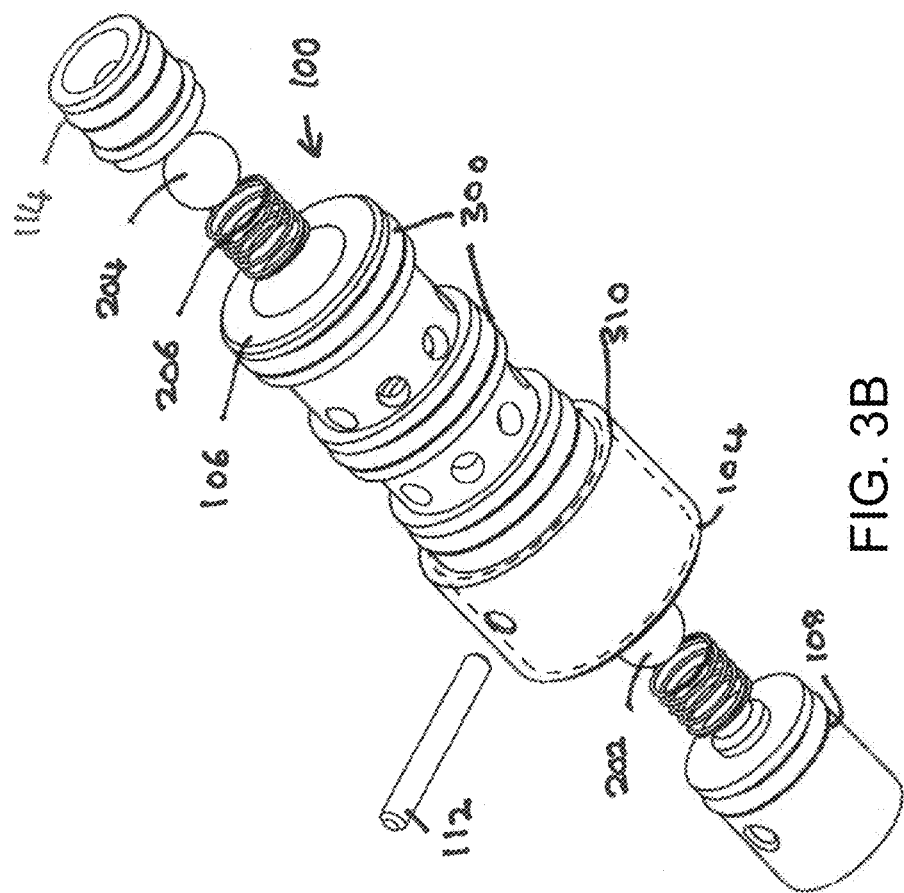
FIGS. 3A and 3B are exploded views of a check valve assembly according to the disclosure, FIG. 3A viewed from one end, FIG. 3B viewed from the opposite end.
Figure 3B:
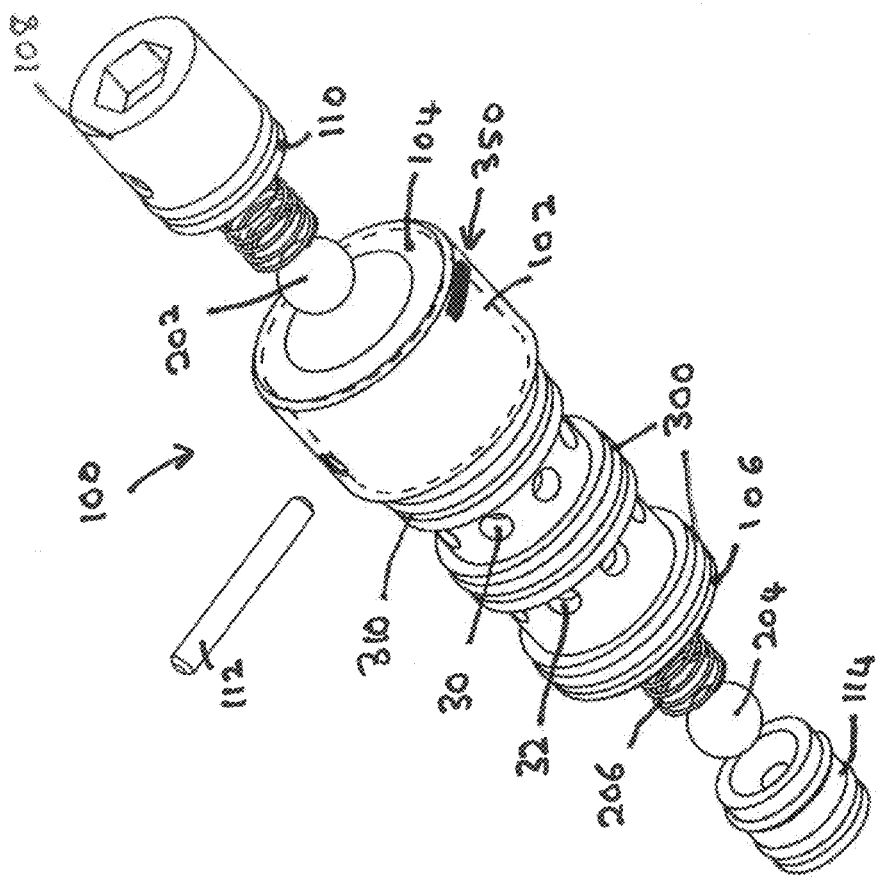
Figure 5:
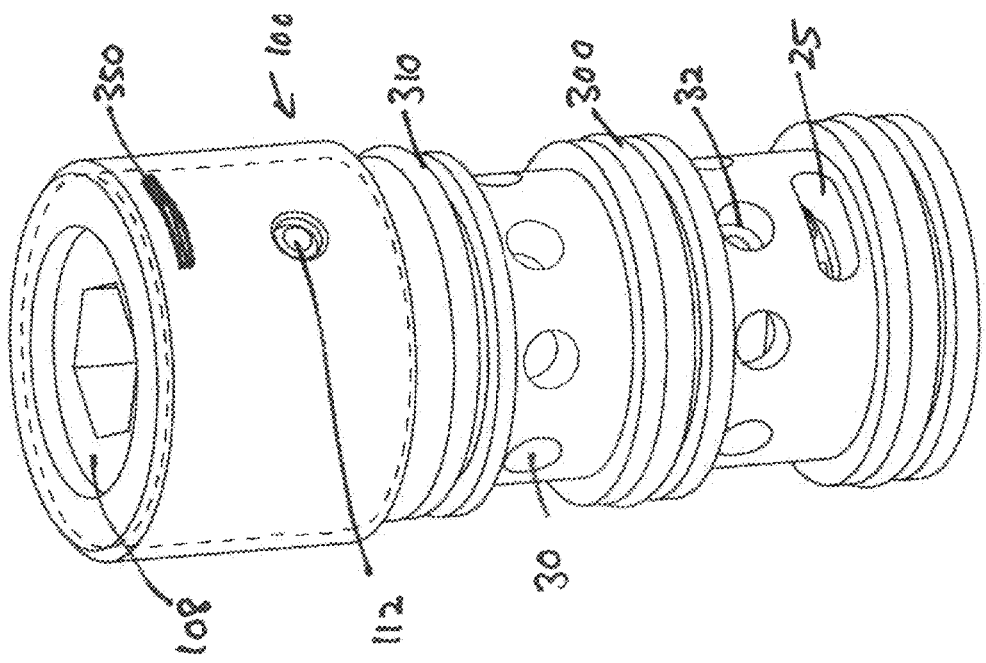
FIG. 5 is a 3D view of the assembly shown in FIGS. 1 to 4.
Figure 4:
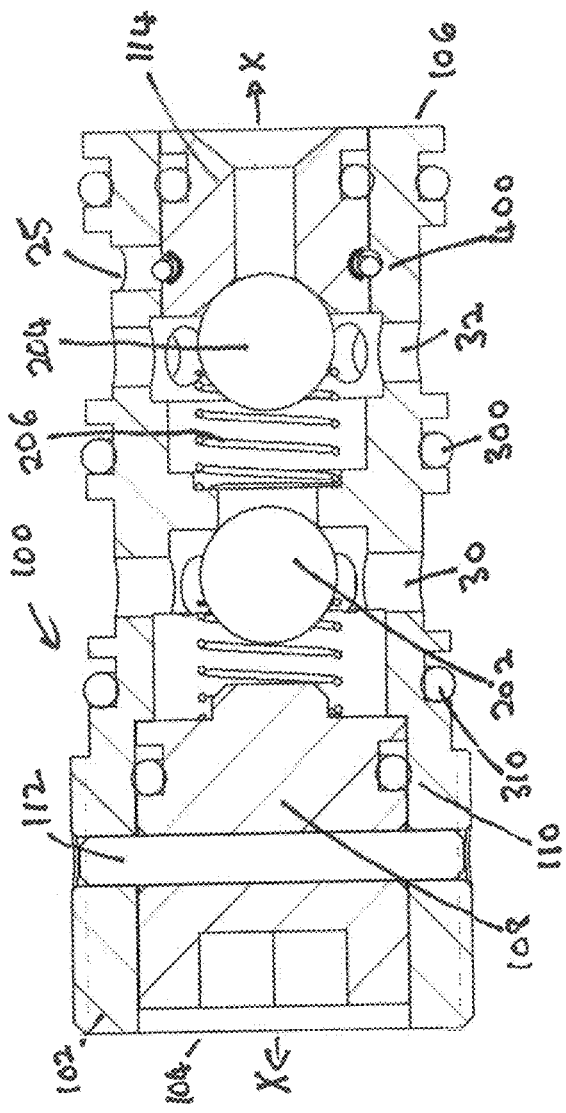
FIG. 4 is a cross-sectional view of the assembly shown in FIG. 3.

The parts making up the two-stage check valve of the disclosure that enable the above-described two-stages of operation using a single check-valve assembly, will be described further with additional reference to FIGS. 3 to 5.

The check valve assembly 100 comprises a valve body 102 having a first end 104 and a second end 106, the valve body extending along an axis X from the first end to the second end. In use, the check valve assembly is arranged such that its first end is adjacent or extends into the tank 10 and the second end 106 is located in the pump housing 1. The check valve outlet 30 is located between the first and the second end. An actuator port 32 is provided in the check valve body at a location axially between the outlet 30 and the second end 106, for fluid connection to the pump actuator 22. The fluid inlet 25 via which the check valve is connected to the tank 10, is provided in the valve body towards the second end 106, axially between the actuator port 32 and the second end.

When assembled, the valve body 102 may be terminated at the first end with a top cap 108, which closes the first end of the check valve from the tank 10. Seals 110 e.g. O-ring seals, may be provided between the top cap and the interior of the valve body to seal the first end of the valve body against leakage. In an example, the top cap 108 is removably fitted into the first end of the check valve and may be secured by e.g. a removable lock pin 112 that can be inserted through a passage extending through the valve body and the top cap, this securing the top cap against axial (and, if required, rotational) movement relative to the valve body. Other means of securing the top cap in the end of the check valve may also be envisaged.

An end retainer 114 may be fitted into the second end of the valve to retain the check valve components within the valve, as described further below. The retainer may also be removably fitted into the end of the check valve body. In the example shown, a safety wire 400 is also provided around the end retainer. This can be used to prevent the retainer from becoming loose e.g. due to vibration.

The check valve components, to be described further below, in the valve body, operate to control the flow of fluid entering the check valve from the tank via the inlet port 25, and leaving the check valve via the outlet, regulated by the pump actuator 22, according to the first and second stages of operation. The check valve components include a first ball 202 located in the valve body adjacent the top cap, and a second ball 204 located in the valve body e.g. adjacent the end retainer 114. A check valve spring 206 may be provided in spring force engagement with the second ball 204. The check valve spring is sized and positioned to bias the second ball against the retainer towards the second end.

Seals 300, 310 may be provided within and around the outside of the check valve.

Where the top cap and the end retainer are removable, the valve body can be opened at both ends, and the components described above can be easily assembled from both ends.

The valve body may be provided with an external thread 350 to simplify assembly and removal of the check valve.

The first and second stages of operation of the check valve, briefly described above with reference to FIGS. 1 and 2, can now be explained in more detail with reference to FIGS. 3A, 3B and 4.

In the first stage of operation, as the lever is operated to move the piston head 54 in the retraction direction A, fluid is drawn from the tank 10 into the check valve at the inlet port 25 due to the pressure difference caused by drawing the head 54 through the chamber 62. The inlet port is located below the tank and the fluid flows, assisted by gravity, from the tank to the inlet port along a fluid line 250 in the direction of arrows S1. The pressure of the fluid (e.g. oil or other hydraulic fluid) being drawn from the tank 10 pushes against the second ball 204 against the force of the check valve spring 206 moving the second ball towards the top end such that the a flow passage is opened between the second ball and the retainer allowing the fluid to flow through that passage and out of the actuator port 32 into the chamber 62 pushing against the piston head 54. The pressure differential in the check valve draws the first ball down towards the second end to a position where it blocks the fluid path from the check valve to the outlet 30. All fluid flow is therefore directed from the tank, via the passage, into the pump piston chamber 62 until the piston reaches the end of its stroke in that direction. Once the flow from the tank 10 stops, because the piston has reached the end of its stroke and the pressure difference between the chamber 62 and the inlet port no longer allows the fluid to flow from the tank, the force of the check valve spring acts to move the second ball back towards the retainer to seat at the retainer and to close the passage from the tank to the check valve. At this stage, the fluid is held in the chamber 62.

In the second stage of operation (FIG. 2), the lever is operated to push the piston head back into the chamber 62 forcing the collected fluid back into the check valve. The force of the fluid injected into the check valve from the chamber, at actuator port 32, adds to the spring force acting in the downwards direction against the second ball, to maintain the engagement between the second ball and the retainer, preventing any flow therebetween. The pressure, at the same time, acts on the first ball 202 forcing it upwards towards the first end this opening a fluid path from the check valve to the outlet 30 (arrows S2) from where it flows through the outlet to the RAT actuator.

This completes one full cycle of collecting the appropriate amount of fluid from the tank (first stage) and ejecting that fluid to the RAT actuator (second stage), both of which are conveniently and simply performed with a single check valve assembly.

Once the piston has reached the end of its ejection stroke and has forced all of the collected fluid from the chamber 62, the first ball is able to return to its positioning closing the fluid path.

The check valve is therefore returned to its start position for further cycles of pump operation.

By locating the inlet port at the lower end of the check valve, and flowing fluid to the check valve via the fluid line 250, flow of fluid from the tank to the check valve is assisted by gravity and is not dependent on any level of fluid in the tank. This is in comparison to a check valve in which the fluid from the tank enters the first end of the check valve that extends into the tank. In such a case, the fluid inlet port in the check valve would need to be positioned within the fluid—i.e. the level of fluid could not be lower than the location of the inlet port in the tank, otherwise air and/or debris could be drawn into the check valve.

Although not shown in the drawings, a filter may also be provided in the fluid line from the tank to the check valve.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A pump unit comprising:
   a pump housing containing a tank of pressurised fluid and having an outlet port via which fluid from the tank exits the pump unit; and
   a check valve assembly between the tank and the outlet port to regulate flow of the fluid from the tank to the port; and
   a pump actuator which cooperates with the check valve to regulate the fluid flow;
   wherein the check valve assembly comprises:
   a valve body having a first end and a second end, the valve body extending along an axis (X) from the first end to the second end such that the second end is lower than the first end;
   a check valve outlet is located between the first and the second end;
   an actuator port provided in the check valve body at a location axially between the outlet and the second end, for fluid connection, in use, to the pump actuator;
   the valve body further comprising a fluid inlet via which the check valve is, in use, connected to a fluid tank,
   the fluid inlet being provided in the valve body towards the second end, axially between the actuator port and the second end;
   the assembly further comprising:
   check valve components located in the check valve body configured to control the flow of fluid entering the check valve from the tank via the fluid inlet, and leaving the check valve via the outlet, according to the first and second stages of operation, the check valve components comprising a first ball located in the valve body adjacent the first end, and a second ball located in the valve body adjacent the second end, and
   a check valve spring provided in spring force engagement with the second ball, the check valve spring being sized and positioned to bias the second ball towards the second end;
   wherein a first stage pressure differential between the actuator port and the fluid inlet creates a fluid flow path from the inlet to the actuator port by causing the second ball to press against the bias of the check valve spring to create a flow passage between the second ball and the second end, and causing the first ball to block the flow of fluid to the outlet, and wherein removal of the first stage pressure differential causes the check valve spring to return the second ball to its biased position to close the passage from the fluid inlet to the actuator port and to cause the first ball to move to open a fluid passage between the actuator port and the outlet;
   wherein pump unit includes one piston, disposed in the pump actuator, and a piston cylinder within which the piston moves between a retracted position and an extended position relative to the cylinder, and whereby, in a first stage of pump operation, the piston is retracted to draw fluid from the tank into the cylinder via the check valve and, in a second stage of operation, after the first stage of operation, the piston is extended relative to the cylinder to eject fluid from the cylinder to the outlet port via the check valve, and
   wherein locating the inlet port at a lower end of the check valve, and fluid flow from the tank to the check valve is assisted by gravity and is thereby independent on a level of fluid in the tank.

2. The pump unit of claim 1, wherein the check valve assembly further comprises a cap at the first end of the valve body.

3. The pump unit of claim 2, wherein the check valve assembly further comprises a locking pin removably mountable through the valve body and the cap to secure the cap in place relative to the valve body.

4. The pump unit of claim 1, wherein the check valve assembly further comprises a retainer at the second end of the valve body.

5. The pump unit of claim 4, wherein the check valve assembly further comprises a safety wire to removably secure the retainer at the first end.

6. The pump unit of claim 5, wherein the check valve assembly further comprises seals provided between parts of the check valve assembly.

7. The pump unit of claim 6, wherein the valve body is provided with an external thread.

8. The pump unit of claim 1, further comprising:
a pump lever having a first end extending out of the pump housing for actuation by a user and a second end connected to the piston, such that movement of the lever moves the piston between the retracted and the extended positions.

9. A ram air turbine (RAT) actuator assembly comprising:
a RAT actuator; and
a pump unit as claimed in claim 1, the RAT actuator connected to the outlet port.

10. A ram air turbine (RAT) assembly comprising:
a RAT; and
a RAT actuator assembly as claimed in claim 9, arranged to stow the RAT.

11. An aircraft having a ram air turbine (RAT) assembly as claimed in claim 10.

12. A check valve assembly comprising:
a valve body having a first end and a second end, the valve body extending along an axis (X) from the first end to the second end such that the second end is lower than the first end;
a check valve outlet is located between the first and the second end;
an actuator port provided in the check valve body at a location axially between the outlet and the second end, for fluid connection, in use, to a pump actuator;
the valve body further comprising a fluid inlet via which the check valve is, in use, connected to a fluid tank, the fluid inlet being provided in the valve body towards the second end, axially between the actuator port and the second end;
the assembly further comprising:
check valve components located in the check valve body configured to control the flow of fluid entering the check valve from the tank via the fluid inlet, and leaving the check valve via the outlet, according to the first and second stages of operation, the check valve components comprising a first ball located in the valve body adjacent the first end, and a second ball located in the valve body adjacent the second end, and
a check valve spring provided in spring force engagement with the second ball, the check valve spring being sized and positioned to bias the second ball towards the second end;
wherein a first stage pressure differential between the actuator port and the fluid inlet creates a fluid flow path from the inlet to the actuator port by causing the second ball to press against the bias of the check valve spring to create a flow passage between the second ball and the second end, and causing the first ball to block the flow of fluid to the outlet, and wherein removal of the first stage pressure differential causes the check valve spring to return the second ball to its biased position to close the passage from the fluid inlet to the actuator port and to cause the first ball to move to open a fluid passage between the actuator port and the outlet.

13. The check valve assembly of claim 12, comprising a cap at the first end of the valve body and a retainer at the second end of the valve body, wherein a cap fastener differs from the retainer fastener.

14. The check valve assembly of claim 13, wherein the cap fastener is a locking pin removably mountable through the valve body and the cap to secure the cap in place relative to the valve body, and the retainer fastener is a safety wire to removably secure the retainer at the first end.

15. The check valve assembly of claim 12, further comprising seals provided between parts of the check valve assembly.

16. The check valve assembly of claim 12, wherein the valve body is provided with an external thread.

17. A pump unit comprising:
a pump housing containing a tank of pressurised fluid and having an outlet port via which fluid from the tank exits the pump unit; and
the check valve assembly of claim 12, between the tank and the outlet port to regulate flow of the fluid from the tank to the port;
wherein pump unit includes one piston, disposed in the pump actuator, and a piston cylinder within which the piston moves between a retracted position and an extended position relative to the cylinder, and whereby, in a first stage of pump operation, the piston is retracted to draw fluid from the tank into the cylinder via the check valve and, in a second stage of operation, after the first stage of operation, the piston is extended relative to the cylinder to eject fluid from the cylinder to the outlet port via the check valve, and
wherein locating the inlet port at a lower end of the check valve, and fluid flow from the tank to the check valve is assisted by gravity and is thereby independent on a level of fluid in the tank.

* * * * *